May 22, 1962     D. E. MOOK ET AL     3,035,922
PRODUCTION OF INSTANT COFFEE
Filed June 25, 1959
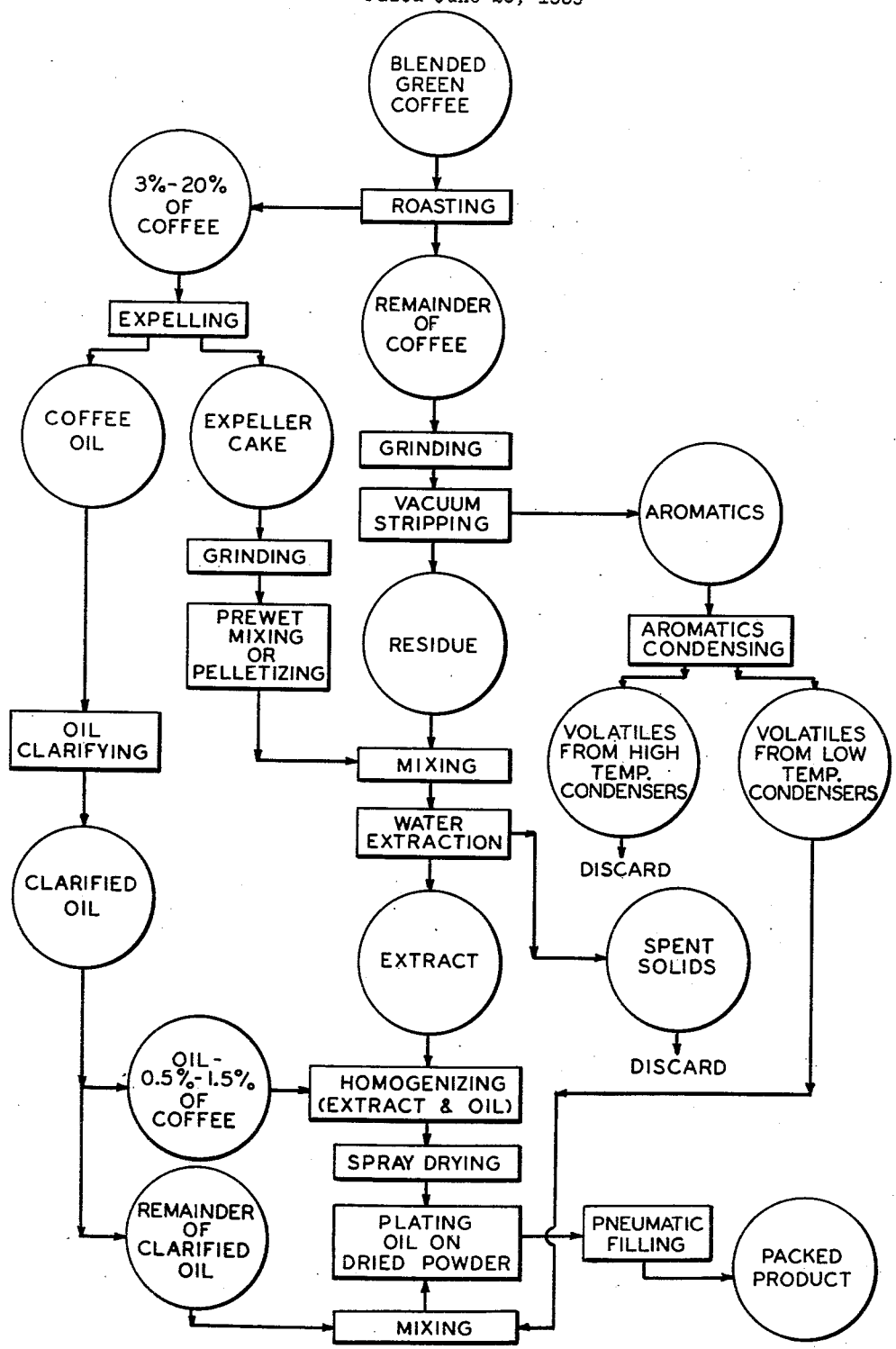

United States Patent Office 3,035,922
Patented May 22, 1962

3,035,922
PRODUCTION OF INSTANT COFFEE
Donald E. Mook, De Witt, Alexander W. Williams, Syracuse, Robert V. Close, Fayetteville, and Cloyce L. Hankinson, Camillus, N.Y., assignors to The Borden Company, New York, N.Y., a corporation of New Jersey
Filed June 25, 1959, Ser. No. 822,851
3 Claims. (Cl. 99—71)

This invention relates to instant coffee of improved flavor and aroma and to the process of making it.

There has been extensive work on the distillation of aroma and flavor components of coffee before water extraction thereof and reintroduction of them at a later stage in the preparation of the instant product.

We have now discovered that most of the aromatic and flavoring materials so separated are undesirable and that we obtain an improved product by reincorporating only a small and specific fraction of the distilled volatile components. Also we have discovered other processing steps and product that preserve, in the finished product, qualities of the coffee oil substantially unmodified by the processing and decrease the loss of active principles by volatilization or oxidation without producing an "oil slick" on the hot water of reconstitution at the time of use.

Briefly stated, the invention comprises expressing coffee oil from a portion only of the roasted coffee to be processed, heating and distilling volatilizable aroma and flavor components from another portion of the roasted coffee in moistened condition and at very low pressure and suitably with steam, making an aqueous extract of the coffee residues from the said expressing and distilling, evaporating the extract to the form of a dry powder, and reincorporating the expressed coffee oil and the condensate from the said distilling.

The proportion of the coffee oil in which the accepted fraction of the distilled aromatic materials are dispersed is that sufficient to protect the aromatic materials from excessive loss by volatilization and from oxidation, particularly during the time of mixing the said dispersion with the extract powder, but is below that proportion which, if used, would show the undesired oil slick.

The removal of a portion of the coffee oil and of the volatilizables in advance of the water extraction decreases the loss or undesirable alteration of the oil and of the volatilizables thereof during the extraction and subsequent evaporation steps.

Repeated taste tests, involving hundreds of possible consumers, have shown a marked superiority in the aroma and flavor of our product in which the distilled volatile materials reintroduced into the whole are only those which are found in that fraction of the vacuum distillate which is the highest in content of ortho-diketones, identification being by standard vapor fractometer method.

The technique of concentrating or purifying various materials by fractional condensation is well known. It normally involves use of a series of condensers held at different temperatures progressing from cool to very cold. When a mixture of vapors is passed through the condensers, the higher boiling components will ordinarily condense out first, leaving the lower boiling components in a more concentrated state to be condensed in a colder condenser. In our system, the reverse of this actually occurs. The lower boiling components, such as acetaldehyde and acetone, actually condense in the higher temperature traps (condensers), while the bulk of the higher boiling diacetyl and acetyl propionyl carry through into the lower temperature traps. Once this result is observed, it may be explained as due in part at least to greater affinity or absorbability of the lower boiling components for or in water. More than 90% of the total water distilled is condensed in the condenser or series of condensers in advance of our coldest condenser. This water carries down with it the bulk of these normally more difficultly condensible components.

It will be understood that there are other products than diketones in the fraction that we accept and reintroduce in making the improved coffee but that the fraction is most easily identified by the content of orthodiketones referred to. The other distilled volatiles which we reject may be used in various foods such as chicory as additives to impart flavor and aroma somewhat suggestive at least of coffee.

The process is illustrated in the attached flow sheet. Details of process steps and equipment not there shown and not discussed herein are conventional.

The drawing shows the division of the coffee after roasting into two parts.

One part is pressed in an oil expeller to produce coffee oil for later return to the coffee extract, suitably after clarification, as by filtering or centrifuging the raw oil.

Another part of the roasted coffee is ground and vacuum stripped by moistening the coffee and distilling at low pressure. The distilled vapors are fractionally condensed by passage through two or more condensers in series at successively lower temperatures, the lowest temperature (last) fraction of the condensate being accepted for return to the extract and, for best results, being dispersed in, i.e., mixed with, a part of the expressed coffee oil and then mixing the resulting dispersion into the dried extract.

To make the extract, the expeller cake or meal from which the oil has been expressed and the residue from the distilling step, either with or without additional coffee direct from the grinding step shown, are subjected to water extraction by any conventional method for making a water extract of coffee.

A variation that we can make from the flow sheet is subjecting a part of the ground coffee to the water extraction, without either expelling oil or distilling volatizables from this part.

The coffee is any good grade, a blend of several types being used ordinarily to give a well balanced flavor.

The proportion of the total coffee that is sent to the oil expeller is not more than 20% of the total. More is unnecessary. About 3%–7% of the total is sufficient ordinarily to provide the clarified oil to disperse the distilled aromas and flavors for reintroduction and to preserve, in the finished product, some of the aroma and flavor qualities of the raw coffee oil. The oil expressed is about 3%–7% of the weight of the coffee introduced into the expeller.

The amount of the coffee subjected to the vacuum stripping may be about 30%–100% and usually is 50%–100% of that not expressed for removal of oil, as up to 97% of the total weight of coffee processed.

The coffee, before being stripped, is mixed with water in amount adequate at least to moisten the ground coffee. Suitable proportions are 5%–50% of water on the weight of the ground coffee.

The proportion in which the expressed oil is added to the dried coffee extract powder may be 0.1%–0.5% of the extract on the dry basis, 0.2%–0.3% being adequate to disperse and protect the volatiles without producing an oil slick and being recommended.

Satisfactory conditions of operation include subjecting the moistened coffee in a stripping chamber to a temperature of approximately 25°–50° C. and gradually reducing the pressure in the still and attached condenser system finally to 1–6 mm. of mercury absolute, although slightly higher pressure may be used as up to 10–20 mm. The stripping by vacuum distillation is continued until the total vapors distilled amount to about 5%–30% of the weight of the original roasted and ground coffee used.

It will be understood that temperatures and pressures are interrelated and that either may be varied somewhat when accompanied by an offsetting change in the other, although both must be low.

The vapors distil off gradually under these conditions and are then fractionally condensed in a series of condensers at very low temperatures, representative temperatures being about 0° C. to minus 80° C., the lowest temperature being in the last of the series of condensers.

The proportion of the total aqueous condensate recovered from the last condenser is normally 10% or less of the total of all the fractions of condensate. This most difficult condensed fraction, on the dry basis, is about 0.1%–1% of the dry weight of the extract.

It is this small fraction of the condensed aromatic materials that we reuse. When conditions of operation are properly adjusted, particularly with respect to the time, rate of reducing the pressure in the stripping chamber, and the temperatures of condensation, this fraction is recognizable by its being that fraction which contains the highest proportion of ortho-diketones such as diacetyl and acetyl propionyl. Although this fraction represents only a tenth or less of the total condensate, in 7 representative runs the fraction contained, on the average, 29.2% of the total diacetyl and 34.8% of the total acetyl propionyl of the whole condensate but only 1.0% of the very low boiling acetaldehyde and only 2.1% of the acetone.

This selected fraction of the concentrated aromatics recovered from the last and coldest of the several fractionating condensers, while best mixed with some of the coffee oil as stated and applied directly to the spray dried product from the extraction step, may also be mixed directly into the spray dried coffee extract.

Among the distilled and condensed volatiles which are rejected and not reintroduced into the coffee in our process are the simple aldehydes and ketones. These materials, generally of low boiling point, condense mostly in the first fractions of the aqueous condensate instead of passing to and condensing predominantly in the last and coldest condenser as would be expected.

The invention will be further illustrated by description in connection with the following specific examples. Here and elsewhere herein all proportions are expressed as parts by weight and all equipment used is conventional.

*Example 1*

A blend of five different types of a good grade of coffee beans, containing about 50% mild coffees, were roasted in the usual manner. One hundred parts of the roasted beans were pressed to expel 5% of oil, the amount of oil so expressed being 0.35 part. This represents approximately a third of the oil present in that portion of the coffee which was pressed.

This oil was clarified by filtration and then stored under refrigeration for subsequent reincorporation partly into the finished dried coffee extract powder. In the homogenizing step there was used 0.28 part of oil. The homogenizing was made with water extract containing 35% of coffee solids, under relatively mild homogenizing conditions as at 500 lbs. pressure in a conventional milk homogenizer. Under such conditions we obtain droplets of dispersed oil of such size as not to give milky appearance in the instant coffee, the droplets being of average size about 1–4 microns. Such size, relatively large for a homogenized product, reduces loss of volatiles from the oil.

The remaining 93 parts of the coffee blend was ground and introduced into the kettle of a vacuum still with agitator, into which kettle there was added also approximately 9 parts of water. The coffee and water were stirred and vacuum distilled at a temperature of 25°– 40° C. for a period of 60 minutes at a final pressure of 4–6 mm. of mercury absolute.

The volatiles so distilled from the coffee were condensed and collected in three fractions of total weight about 5 parts, this being not more than the water content of the moistened coffee and the first two condensers operating at temperatures of about 0° to minus 24° C. and the second and final condenser at a temperature of minus 45° to minus 80° C. and pressure down to 4–6 mm. absolute in the later stages of distillation. Although the fraction from the final condenser represented only a small part, actually 7% of the total condensate, or 0.35 part by weight, it is the only fraction of the volatilized material that we have found useful in blending to give the improved flavor and aroma of the instant coffee.

This third and useful fraction of the distillate was maintained in contact with 1% of ascorbic acid, on the weight of the fraction, as an antioxidant and kept refrigerated until finally dispersed in the expressed coffee oil. The coffee oil, in contact with the admixed fraction of the vacuum distillate, protects the latter from volatilization and restricts contact with oxygen. The oil also increases the resemblance of the flavor of the finished blended product to that of the original coffee.

The aqueous coffee extract was made in the usual manner from the coffee meal remaining after expressing the oil from a part of the coffee as described and from the residue after the vacuum distillation. Thus the said meal and residue were percolated with water to dissolve out the water solubles and the resulting extract spray dried at a maximum 220° C. to give about 35 parts of powder. Into this powder the distillate fraction of high orthodiketone content, after dispersion in the remaining 0.07 part of the expressed oil, was mixed by what we call the "plating" process.

The instant coffee powder so made is then gas-packed under nitrogen, carbon dioxide, or nitrous oxide for distribution.

*Example 2*

The procedure and proportions of Example 1 are used except that only a part of the said 93 parts of the total coffee is subjected to the vacuum distillation. The remainder, that may be a third to a half of the original coffee, is subjected in ground roasted condition directly to the usual water extraction and spray drying steps. All extracts are combined for the later reconstitution steps.

With the process described in Example 1 or 2 and elsewhere herein there is obtained a coffee of pleasing aroma and flavor without the bitterness previously obtained in the reconstituted instant coffee.

*Example 3*

To make an instant coffee in which accessibility of the aroma and flavoring components to air and their loss by volatilization are reduced, the aroma and flavor producing components are distilled in vacuum from a mixture of ground roasted coffee and added water. Another portion of roasted coffee is pressed to expel coffee oil and the oil clarified by filtration. The distilled components in their aqueous solution are then homogenized in the proportion of 1 part with 0.2 part of the coffee oil and the resulting dispersion is mixed in the proportion of 1 part with 100 parts of spray dried water extract of coffee.

The product of this example loses aroma and flavor less rapidly than conventional dried coffee extracts but possesses some of the bitter taste that is removed by the processes of Examples 1 and 2.

It is to be understood that it is intended to cover all changes and modifications of the examples of the invention herein chosen for the purpose of illustration which do not constitute departures from the spirt and scope of the invention.

We claim:

1. In making an instant coffee powder of improved flavor and aroma, the process which comprises mixing the coffee in roasted and ground condition with at least 5 parts by weight of water for 100 parts of the coffee, distilling the resulting moistened coffee in vacuo until the total of the vapors distilled amounts on the wet basis to approximately 5%–30% of the weight of the original coffee used and not substantially more than the water content of the said moistened coffee, condensing the distilled vapors at successively lower temperatures within the range beginning at about 0° and ending at about −80° C. and at a pressure of about 4–6 mm. of mercury so as to condense fractionally the said vapors and produce a plurality of aqueous condensates including one aqueous condensate fraction that is the highest of the condensates in percentage concentration of ortho-diketones, forming an aqueous extract of the coffee residue from the said distilling, evaporating the said extract to a dry powder, mixing the said one aqueous condensate fraction only with the dry powder and discarding the other fractions of the condensed vapors, the amount of the said one fraction corresponding to not more than 10% of the total aqueous condensate and on the dry basis to about 0.1%–1% of the dry weight of the said extract.

2. The process of claim 1 which includes subjecting a portion of the coffee after roasting to pressure to express coffee oil therefrom, making a dispersion of the said one condensate fraction of highest concentration of ortho-diketones with the expressed coffee oil, and incorporating the resulting dispersion into the said dry powder.

3. The process of claim 1, the said one aqueous condensate fraction being that which condenses only at temperatures not above −40° C. at a pressure of about 4–6 mm. of mercury.

References Cited in the file of this patent

UNITED STATES PATENTS

| | | |
|---|---|---|
| 1,292,458 | Hamor et al. | Jan. 28, 1919 |
| 1,605,115 | Kellogg | Nov. 2, 1926 |
| 2,432,759 | Heyman | Dec. 16, 1947 |
| 2,562,206 | Nutting | July 31, 1951 |
| 2,680,687 | Lemmonier | June 8, 1954 |
| 2,853,387 | Nutting | Sept. 23, 1958 |
| 2,947,634 | Feldman | Aug. 2, 1960 |